(12) United States Patent
Krasko

(10) Patent No.: US 7,992,312 B2
(45) Date of Patent: Aug. 9, 2011

(54) POSITIONING SYSTEM FOR LASER ALIGNMENT TOOLS

(76) Inventor: Michael E. Krasko, Battle Ground, WA (US)

( * ) Notice: Subject to any disclaimer, the term of this patent is extended or adjusted under 35 U.S.C. 154(b) by 200 days.

(21) Appl. No.: 12/500,491

(22) Filed: Jul. 9, 2009

(65) Prior Publication Data
US 2010/0170099 A1 Jul. 8, 2010

Related U.S. Application Data

(60) Provisional application No. 61/134,641, filed on Jul. 10, 2008.

(51) Int. Cl.
*G01B 11/00* (2006.01)
*G01B 11/27* (2006.01)
*G01B 1/00* (2006.01)
(52) U.S. Cl. ................... 33/286; 33/529; 33/DIG. 21
(58) Field of Classification Search .............. 33/227, 33/286, 412, 529, 613, 645, DIG. 21; 248/542, 248/543, 904
See application file for complete search history.

(56) References Cited

U.S. PATENT DOCUMENTS

| | | | | |
|---|---|---|---|---|
| 4,566,202 A * | 1/1986 | Hamar | ............................. | 33/286 |
| 6,124,935 A * | 9/2000 | Matthews | ..................... | 356/399 |
| 6,393,708 B1 * | 5/2002 | Culver et al. | ................... | 33/397 |
| 6,643,019 B1 * | 11/2003 | Jeanneret | ..................... | 356/399 |
| 6,718,644 B1 * | 4/2004 | Perkins et al. | ................. | 33/286 |
| 6,804,897 B1 * | 10/2004 | Horn | ................................ | 33/606 |
| 7,155,834 B2 * | 1/2007 | Palumbo et al. | ................ | 33/286 |
| D574,274 S * | 8/2008 | D'Olimpia | .................... | D10/69 |
| 7,467,474 B1 * | 12/2008 | Statham | .......................... | 33/286 |
| 7,788,814 B2 * | 9/2010 | Collins | ........................... | 33/286 |
| 7,793,423 B2 * | 9/2010 | Loftis et al. | ..................... | 33/286 |
| 2010/0237209 A1 * | 9/2010 | Whittemore et al. | ...... | 248/218.4 |
| 2010/0276555 A1 * | 11/2010 | Steffen et al. | ............. | 248/206.5 |

FOREIGN PATENT DOCUMENTS
DE 3226881 A1 * 1/1984

OTHER PUBLICATIONS
RoboToolz® Catalog, published 2006, all pages.

* cited by examiner

*Primary Examiner* — R. A. Smith
(74) *Attorney, Agent, or Firm* — Mark E. Beatty; Kurt M. Rylander; Rylander & Associates PC.

(57) ABSTRACT

A laser alignment tool positioning system, includes a magnetically susceptible laser platform having a first mounting surface and an opposing second surface; a mounting post extending from the laser platform; a target on the mounting surface marking the mounting post centerpoint, and a plurality of mounting post adaptors. The laser platform may include magnets proximal to the mounting post base. A semi-rigid offset portion with threaded ends is provided, with an adaptor having a threaded portion to couple to the threaded ends and a slip fitting to couple to the mounting post adaptor. The mounting post may include an interior threaded portion to couple to the offset portion threaded ends. The target includes concentric circles indicating selected pipe sizes, with the concentric circles and mounting post adaptors including color coding corresponding to the selected pipe sizes. The positioning system may include a level indicator mounted to the laser platform.

10 Claims, 9 Drawing Sheets

POSITIONING SYSTEM FOR LASER ALIGNMENT TOOLS

CROSS-REFERENCE TO RELATED APPLICATION

The present application claims priority to U.S. Provisional Application 61/134,641 filed Jul. 10, 2008.

FIELD OF THE INVENTION

The present invention relates to positioning systems for laser alignment tools.

BACKGROUND

Electricians and mechanical contractors are frequently required to install long runs of conduit or pipe through open areas requiring precise installation of support racks and precise installation of the receiving point. For example, electrical conduit and mechanical piping is generally pre-installed or "stubbed" so that they are in place when a building foundation or concrete floor is poured. The electrician then must extend the conduit from that stub through a ceiling which is anywhere from fifteen to fifty feet above the stub, or even greater distances. Aligning the penetration through the ceiling, which is often also the next floor of a multi-story building, requires great precision. In addition, an electricians and mechanical tradesmen must often run electrical conduit or piping in very tight confined spaces which cannot accommodate misalignments. Slight misalignments at each stage can accumulate to cause major installation problems: the stubs must be precisely aligned because they cannot generally be adjusted after concrete is poured; penetrations through ceilings/floors or walls must be precise because they cannot interfere with equipment layouts on the opposite sides; runs must be precisely aligned so as to not interfere with intersecting runs of piping and conduit, etc.

Similarly, long horizontal runs of conduit or pipe must be sighted with great precision. Precise alignment is required to prevent interference with other runs of conduit or piping, whether parallel runs or intersecting runs. Additionally, horizontal piping runs require a precise slope depending on the pipe design and fluid. Drain lines for example, require a minimum slope of ⅛ inch drop per 1 foot of run, and may also be restricted by a maximum slow of ¼ inch drop per foot in order to control flow rates, flushing action, and fluid velocity. Even piping or conduit not requiring precise slopes require precise placement to intersect with branch lines and to align with locations where they are to penetrate through another wall, floor, or connect to installed equipment. Support racks must be constructed prior to installing the piping or conduit and require the same precise alignment as the runs they support.

Traditionally, alignment of long vertical runs required a team of installers and expensive lifting equipment. Several installers working on lifts or scaffolding would be required to measure and locate the upper penetration point, then drop a plum line from that point to determine the proper location for the stub, or to determine the required offset. Lifting equipment is expensive, the process is time consuming, and labor costs are high due to the number of installers required. Worse still, the end product is often misaligned due to the difficulty in coordinating people and taking measurements off of different reference points.

Similarly, traditional methods for aligning long horizontal runs require multiple installers and significant equipment. The support racks often are fabricated on-site using supporting beams suspended from an overhead. The standard material used for the supporting beams is UNISTRUT® or similar modular metal framing systems which are provided in standard dimensioned cross-sections. Each support rack must be sighted and aligned vertically, requiring multiple installers using plum lines and measuring tapes. Again, the end result is often misalignment even when performed by experienced install teams.

Laser alignment tooling and sighting systems have greatly improved the productivity and precision of install teams, but often the inability to easily align the laser to the start point necessitates ad hoc solutions which, in addition to adding labor and time costs, result in precise but ultimately inaccurate measurements. The laser devices themselves are not able to mount directly to a conduit or pipe such that the laser can be centered in the pipe or conduit cross section itself. For support racks, the laser needs to be centered at the midpoint of the support beam, or the top or bottom edge.

Magnetic mounting means have been provided for many laser devices, but generally cannot be used to mount directly to conduit or piping, or a support rack. Additionally, often conduit, piping, and support racks are made from non-magnetic materials, so even laser devices with magnetic mounting systems can't be mounted directly to the structures for sighting. Additionally, even if the laser could be mounted directly to a conduit end, for example, there is no easy way to incorporate an offset into the laser spotter when required. The result is that, even with laser alignment tooling and spotting devices, install teams require extra bodies and extra equipment—and time—to sight conduit and pipe runs.

Thus, there is a need for a positioning system for laser devices that (1) is compatible with most magnetically mounted laser devices; (2) provides the ability to align a magnetic mounted laser spotter for direct centering over a conduit or pipe; (3) provides the ability to align a magnetic mounted laser spotter for direct centering on a supporting beam; (4) is inexpensive to manufacture; (5) is simple to use; (6) is universally adaptable to any standard conduit size or support beam size; (7) reduces the number persons required for an installation; (8) reduces the time required for an installation; (9) reduces the number of man-lifts or scaffolding systems required and the time they are required for an install; (10) provides improved accuracy for sighting installations; (11) provides the ability to easily measure angular offsets or provide templates for fabricating offsets.

A number of devices have provided magnetically mounted laser devices, but lack the simplicity, inexpensiveness, broad interoperability, and accuracy of the present invention. Presently known art attempts to address this problem, but has not completely solved the problem.

Thus, while the foregoing body of art indicates it to be well known to have a laser alignment tooling device, the art described above does not teach or suggest a positioning system which has the following combination of desirable features: (1) compatible with most magnetically mounted laser devices; (2) provides the ability to align a magnetic mounted laser spotter for direct centering over a conduit or pipe; (3) provides the ability to align a magnetic mounted laser spotter for direct centering on a supporting beam; (4) is inexpensive to manufacture; (5) is simple to use; (6) is universally adaptable to any standard conduit size or support beam size; (7) reduces the number persons required for an installation; (8) reduces the time required for an installation; (9) reduces the number of man-lifts or scaffolding systems required and the time they are required for an install; (10) provides improved accuracy for sighting installations; (11) provides the ability to easily measure angular offsets or provide templates for fabricating offsets.

SUMMARY AND ADVANTAGES

A laser alignment tool positioning system, comprises a laser platform, said laser platform including: a first mounting surface and an opposing second surface, wherein said platform includes materials which are magnetically susceptible; a mounting post having a base connected to said laser platform second surface and a distal end extending perpendicularly from said laser platform second surface; and, a target marked permanently onto said first mounting surface, said target including indicia marking the center point of said mounting post; and, a plurality of mounting post adaptors, each of said mounting post adaptors having a first threaded portion adapted for connecting to a selected threaded pipe end, and an opposing second slip portion adapted for receiving said mounting post distal end therein.

A laser alignment tool positioning system may include a slotted mounting hole penetrating through the laser platform.

A laser alignment tool positioning system may include wherein each of said plurality of mounting post pipe adaptors is made from magnetically susceptible materials, and wherein said laser platform further includes one or more magnets mounted to said second surface proximal to said mounting post base.

A laser alignment tool positioning system may include a semi-rigid offset portion including first and second opposing threaded ends; an offset portion adaptor comprising: a first threaded portion adapted to couple to at least one of said offset portion threaded ends, and an opposing second slip fitting portion adapted to couple with said mounting post adaptor slip portion; and, wherein said mounting post further includes a hollow interior portion having a threaded portion adapted to couple to at least one of said offset portion threaded ends, and further wherein said mounting post distal end is open to said hollow interior.

A laser alignment tool positioning system may include wherein said target further comprises a plurality of concentric circles centered on said center point, each of said plurality of circles indicating a circumference of a selected pipe size.

A laser alignment tool positioning system may include wherein each of said concentric circles includes a color coded portion corresponding to said selected pipe size.

A laser alignment tool positioning system may include wherein said target further comprises a plurality of concentric circles centered on said center point, each of said plurality of circles indicating a circumference of a selected pipe size, and wherein each of said concentric circles includes a color coded portion corresponding to said selected pipe sizes, and wherein each of said plurality of mounting post adaptors includes a color coded portion corresponding to one of said color coded target circles matching the corresponding pipe size of said mounting post adaptor's first threaded portion.

A laser alignment tool positioning system may include a level indicator mounted to said laser platform.

The laser alignment tool positioning system of the present invention presents numerous advantages, including: (1) it is compatible with most magnetically mounted laser devices and mechanically mounted devices; (2) provides the ability to align a magnetic mounted laser spotter for direct centering over a conduit or pipe at any angle of projection; (3) provides the ability to align a magnetic mounted laser spotter for direct centering on a supporting beam; (4) is inexpensive to manufacture; (5) is simple to use; (6) is universally adaptable to any standard conduit or pipe size or support beam size; (7) reduces the number persons required for an installation; (8) reduces the time required for an installation; (9) reduces the number of man-lifts or scaffolding systems required and the time they are required for an install; (10) provides improved accuracy for sighting installations; (11) provides the ability to easily measure angular offsets or provide templates for fabricating offsets.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

BRIEF DESCRIPTION OF REFERENCE NUMBERS

Figure 1:
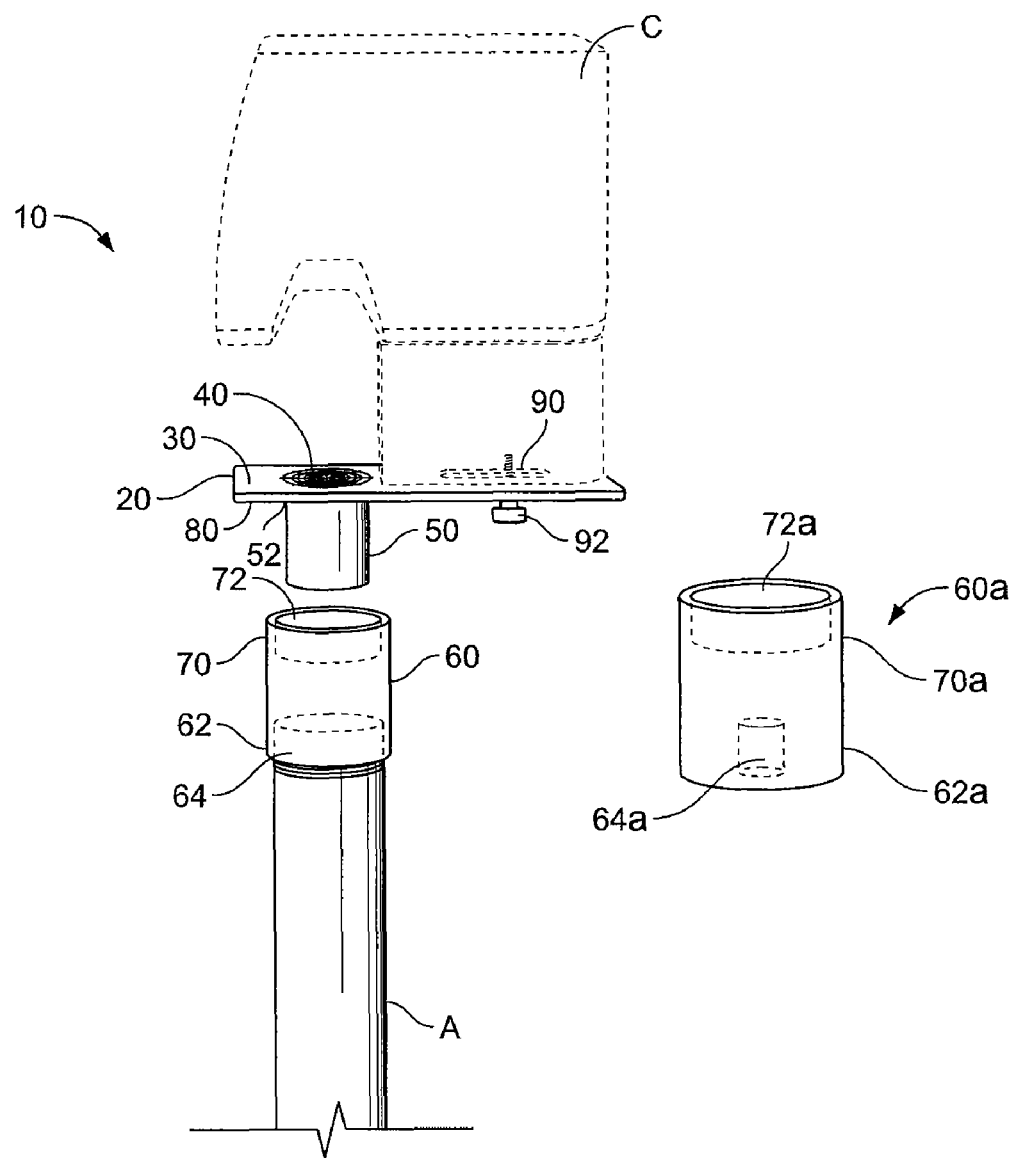
FIG. 1 shows a side view of a first embodiment.

Below is a list of the reference numbers used in the description and the drawings, which is provided for convenience and is not intended to limit the scope of the invention in any way:

| Reference Number | Description |
|---|---|
| 10 | First embodiment of a positioning system for a laser alignment tool |
| 20 | Laser Platform |
| 30 | Laser Mounting Surface |
| 40 | Target |
| 46 | Target Center point Indicia |
| 48 | Target Concentric Circle Indicia |
| 50 | Mounting Post |
| 52 | Mounting Post Base |
| 54 | Mounting Post Distal End |
| 60 | Mounting Post Adaptor |
| 62 | Mounting Post Adaptor First Portion |

-continued

| Reference Number | Description |
| --- | --- |
| 64 | Female Threads |
| 70 | Mounting Post Adaptor Second Portion |
| 72 | Slip Fitting Interior Walls |
| 80 | Laser Platform Second surface |
| 82 | Second surface Magnets |
| 90 | Slot |
| 92 | Clamp Bolt |
| 100 | Second Embodiment |
| 120 | Laser Platform |
| 130 | Laser Mounting Surface |
| 140 | Target |
| 142 | Laser Platform Level Indicator |
| 150 | Mounting Post |
| 152 | Mounting Post Base |
| 154 | Mounting Post Distal End |
| 156 | Mounting Post Hollow Interior Portion |
| 158 | Threads |
| 160 | Mounting Post Adaptor |
| 162 | Mounting Post Adaptor First Portion |
| 164 | Female Threads |
| 170 | Mounting Post Adaptor Second Portion |
| 172 | Slip Fitting Interior Walls |
| 174 | Key Portion |
| 180 | Laser Platform Second surface |
| 190 | Semi-rigid Extension Piece |
| 192 | Extension Piece First End |
| 194 | Male Threaded Coupling |
| 196 | Extension Piece Second End |
| 198 | Male Threaded Coupling |
| 200 | Extension Piece Adaptor |
| 202 | Extension Piece Adaptor First Portion |
| 204 | Threaded Coupling |
| 206 | Extension Piece Adaptor Second Portion |
| 208 | Slip Fitting |
| 210 | Key Portion |
| 1000 | Third Embodiment |
| 1020 | Laser Platform |
| 1030 | Laser Mounting Surface |
| 1040 | Vertical Flange |
| 1050 | Locking Bolt |
| 1060 | First Alignment Slot |
| 1065 | First Alignment Slot Internal Lip |
| 1070 | Second Alignment Slot |
| 1080 | Locking Nut |
| 1090 | Aligning Post |
| 1100 | Beam clamp |
| 1110 | Beam clamp Vertical Portion |
| 1120 | Clamp Hook |
| 1130 | Threaded Bolt Handle |
| 1140 | Clamp Head |
| 1150 | Clamp Bolt |
| 1160 | Threaded Hole |
| 1170 | Clamp Hook Top Portion |
| 1180 | Target Slot |
| A | Conduit Stub |
| C | Laser alignment tool |
| D | Floor |
| E | Beam |

DETAILED DESCRIPTION

Before beginning a detailed description of the subject invention, mention of the following is in order. When appropriate, like reference materials and characters are used to designate identical, corresponding, or similar components in differing figure drawings. The FIGURE drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The following terms shall have specific definitions as used in this Specification. "Semi-rigid" means a pipe, tube, snake or similar elongated piece constructed with flexibility so as to be bendable by hand, but which has sufficient rigidity to retain its bent shape and support the weight of a laser device without displacing. "Magnetically susceptible" means a material, such as ferrous metal, that is attracted by a magnet or magnetic field (such as generated by an electromagnet or solenoid).

A laser alignment tool positioning system, includes a laser platform, said laser platform having a first mounting surface and an opposing second surface, wherein the laser platform includes materials which are magnetically susceptible; a mounting post having a base connected to the laser platform second surface and a distal end extending perpendicularly from the laser platform second surface; and, a target marked permanently onto the first mounting surface, the target including indicia marking the center point of the mounting post; and, a plurality of mounting post adaptors, each of the mounting post adaptors having a first threaded portion adapted for connecting to a selected threaded pipe end, and an opposing second slip portion adapted for receiving the mounting post distal end therein. A laser alignment tool positioning system may include a slotted mounting hole penetrating through the laser platform. A laser alignment tool positioning system may include wherein each of the plurality of mounting post pipe adaptors is made from magnetically susceptible materials, and wherein the laser platform further includes one or more magnets mounted to the second surface proximal to the mounting post base. A laser alignment tool positioning system may include a semi-rigid offset portion including first and second opposing threaded ends; an offset portion adaptor comprising: a first threaded portion adapted to couple to at least one of the offset portion threaded ends, and an opposing second slip fitting portion adapted to couple with the mounting post adaptor slip portion; and, wherein the mounting post further includes a hollow interior portion having a threaded portion adapted to couple to at least one of the offset portion threaded ends, and further wherein the mounting post distal end is open to the hollow interior. A laser alignment tool positioning system may include wherein the target further comprises a plurality of concentric circles centered on the center point, each of the plurality of circles indicating a circumference of a selected pipe size. A laser alignment tool positioning system may include wherein each of the concentric circles includes a color coded portion corresponding to the selected pipe size. A laser alignment tool positioning system may include wherein the target further comprises a plurality of concentric circles centered on the center point, each of the plurality of circles indicating a circumference of a selected pipe size, and wherein each of the concentric circles includes a color coded portion corresponding to the selected pipe sizes, and wherein each of the plurality of mounting post adaptors includes a color coded portion corresponding to one of the color coded target circles matching the corresponding pipe size of the mounting post adaptor's first threaded portion. A laser alignment tool positioning system may include a level indicator mounted to the laser platform.

Figure 2:
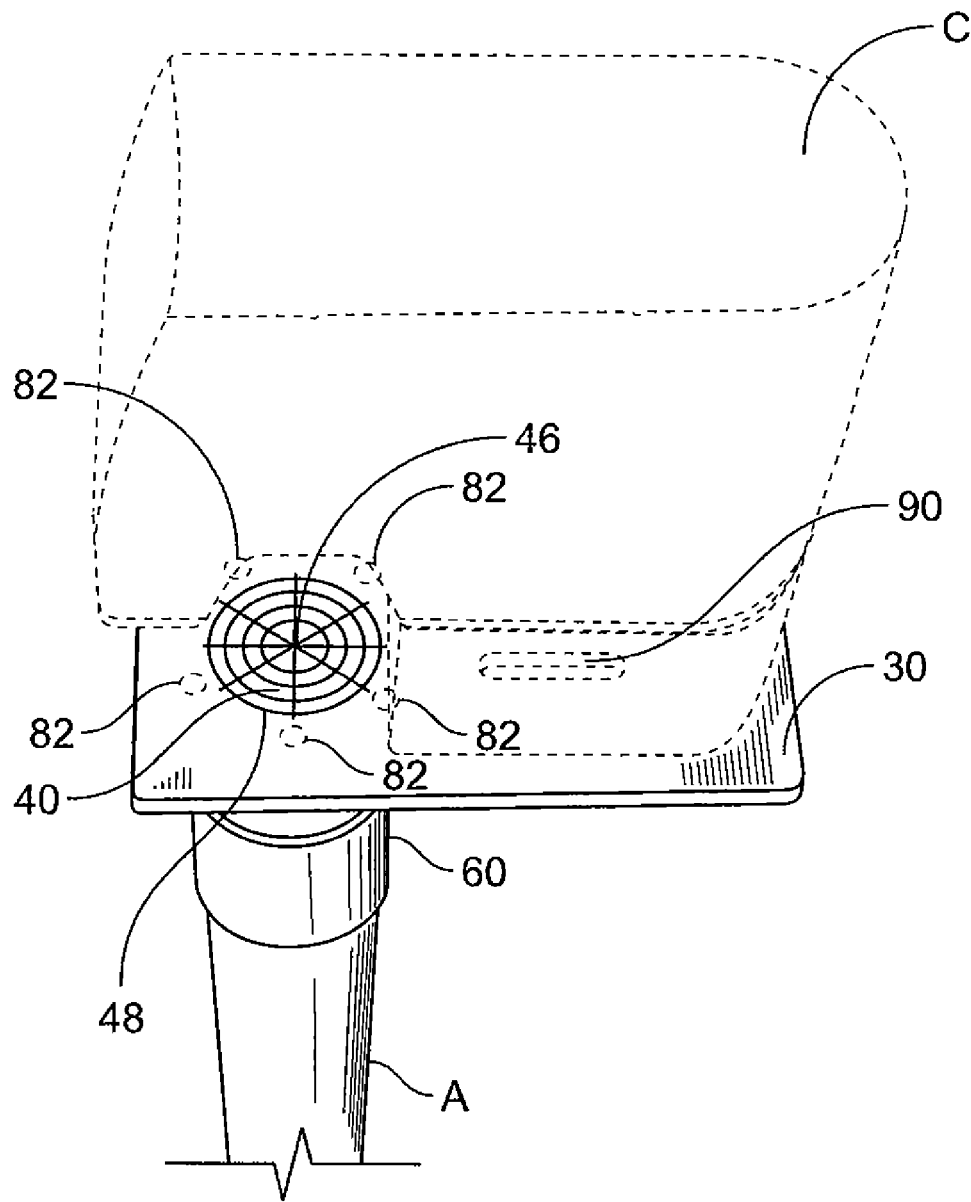
FIG. 2 shows a perspective view of a first embodiment.

Referring to FIGS. 1-2, a first embodiment of a positioning system 10 for laser alignment tools is shown. Laser alignment tool C is being used to vertically align conduit stub A which is penetrating up through concrete floor D. The positioning system 10 includes laser platform 20 with a first laser mounting surface 30 and an opposing second surface 80. Mounting post 50 has a base 52 connected to the second surface 80 of laser platform 20 and extends perpendicular from laser platform 20 to mounting post distal end 54. The central axis of mounting post 50 is perpendicular to the plane of laser platform 20.

Target 40 is marked onto mounting surface 30 such that the center point indicia 46 of target 40 aligns with the central axis of mounting post 50, and therefore with the center point of conduit stub A. Preferably target 40 consists of concentric calibrated circles 48, corresponding to selected pipe sizes, with cross-hairs scribed into the surface for ease of use. In the first disclosed embodiment the target circles are scribed at 0.84 inches (20 mm), 1.05 inches (26 mm), 1.31 inches (33 mm), 1.66 inches (42 mm), 1.90 inches (48 mm) and 2.375 inches (60 mm) diameters. Target 40 may be marked by any suitable permanent system, for example permanent paint, etching, scribing or stamping. Each of circles 48 preferably include a colored portion corresponding to a selected pipe size for easy reference.

Laser platform 20 is preferably fabricated from a sheet of carbon steel, of 1/16 inch (1.5 mm) thickness or greater, in order to provide adequate strength and magnetic coupling with the magnetic mount of laser C. In the first disclosed embodiment laser platform 20 is fabricated from 1/4 inch (6 mm) carbon steel. Laser platform 20 may also be made from a combination of non-magnetic materials and magnetically susceptible materials to reduce weight, such as an aluminum or plastic plate with a thin steel sheet laminated on to provide magnetic coupling. Laser platform 20 preferably includes one or more magnets 82 mounted to laser platform second surface 80 to provide assist in seating laser platform 20 against mounting post adaptor 60.

Laser platform 20 preferably includes a slot 90 to receive a clamping bolt 92 there through, to engage a threaded mounting hole on the underside of a laser alignment tool C to allow mechanically mounting a laser alignment tool, either alternatively or in addition to magnetic mounting. Slot 90 is aligned with the center point 46 of target 40 to provide proper alignment of the laser alignment tool C. Preferably slot 90 is sized to accommodate a 1/4 inch (6 mm) bolt, which would adapt to the majority of laser alignment tools designed to mount to tripods, which generally use 1/4-20 threads in the United States.

Mounting post 50 connects to conduit stub A by mounting post adaptor 60. Mounting post adaptor 60 has a first threaded portion 62 with threads 64 corresponding to a selected pipe thread size to couple to conduit stub A, and an opposing second slip portion 70 with a slip fitting adapted to receive mounting post 50. Slip fitting portion 70 has smooth interior walls 72 for receiving mounting post 50 snuggly. Interior walls 72 and mounting post 50 may be tapered to make insertion and extraction easier. A plurality of mounting post adaptors 60 and 60a are provided, each of which is essentially identical except that the threads 64 and 64a are selected to adapt to different pipe sizes and threads. Slip fitting portions 70 and 70a have essentially identical interior dimensions, such that the cross sections circumscribed by interior walls 72 and 72a are identical to each other and to the cross section of mounting post 50 so as to be interchangeable. Preferably a plurality of mounting post adaptors would include a range of the standard pipe thread sizes likely to be encountered by a given tradesman, and each of the mounting post adaptors include a color coded portion to correspond to a color coded concentric circular indicia 48 of target 40. Color coding assists the operator in determining if the full diameter of stub A will clear interferences. In this regard, a color coded portion includes the alternative where the entirety of a circle is colored.

Figure 3:
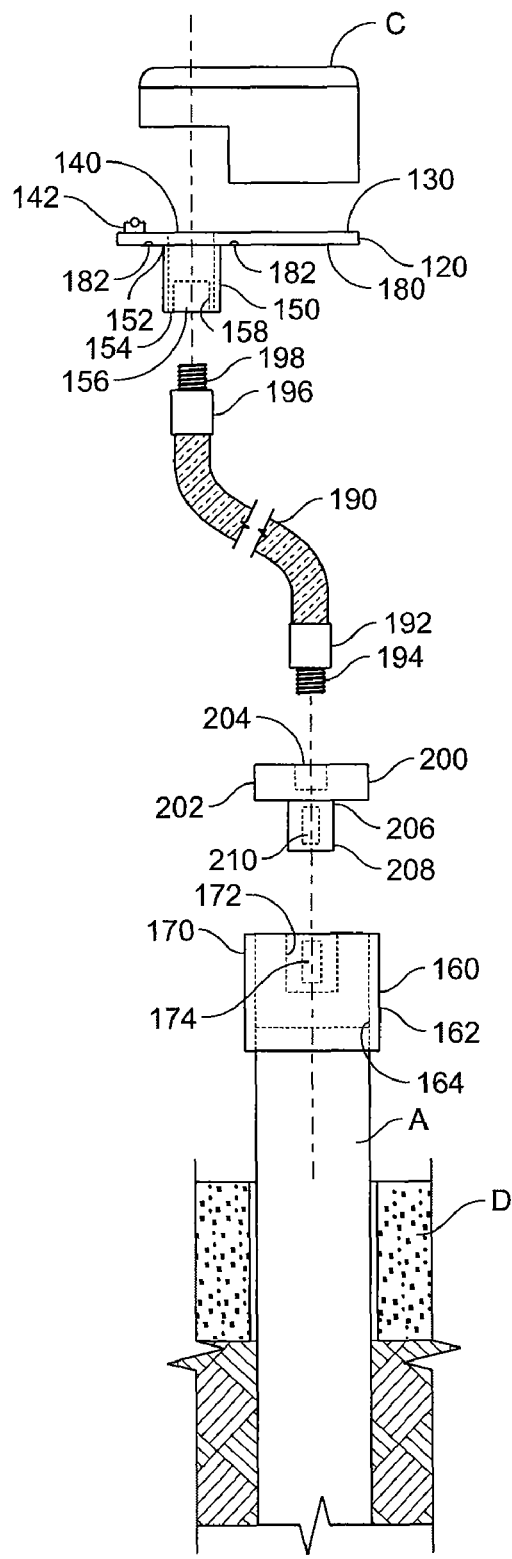
FIG. 3 shows an exploded side view of a second embodiment.

A bubble level indicator, such as bubble level 142 shown in FIG. 3, can be provided on laser platform 20 for easy visualization of true level, or to provide an angular measurement of the out-of-vertical displacement of conduit stub A, which may be askew as well as offset.

Referring to FIGS. 1-2, in operation of the first embodiment, a conduit stub A with a male threaded termination is to be run vertically to a connection point. It is understood that conduit stub A could also be any type of pipe, a threaded post marking a reference point, or other projection requiring alignment or measurement. An installer selects a mounting post adaptor 60 from a plurality of mounting post adaptors 60, 60a & etc., to correspond with the thread of stub A. Mounting post adaptor 60 is coupled to stub A by threads 64. Laser platform 20 is mounted by inserting mounting post 50 into adaptor slip portion 70. Magnets 82 are attracted to mounting post adaptor 60 to assist in securely fitting and holding mounting post 50 into adaptor 60. A laser alignment tool C is placed on mounting surface 30 and aligned to the center point 46 of target 40. If laser C has a magnetic mounting system the magnet will couple to the magnetically susceptible material in platform 20 to hold the laser firmly in place. Alternatively, or in addition to a magnetic mounting system, clamping bolt 92 may be inserted through slot 90 to thread into a receiving bolt hole commonly found on the bottom of such lasers, which is especially useful if stub A were projecting down from an overhead location, or horizontally out of a wall. The laser alignment tool C, now aligned with the centerline axis of conduit stub A, will project a laser spot vertically to the ceiling or some other connection point which aligns with the centerline axis of conduit stub A.

Preferably a plurality of mounting post adaptors would include a range of the standard pipe thread sizes likely to be encountered by a given tradesman, and the mounting post adaptors will each include a color coded portion to correspond to the color coded concentric circular indicia 48 of target 40. Color coding assists the operator in determining if the pipe diameter will clear interferences. The operator can align the downward laser target onto the circle 48 which corresponds to the color of mounting post adaptor 60, thereby projecting the location of the wall of stub A, similarly to projecting the center point of the stub A, to check for clearance.

Figure 4:
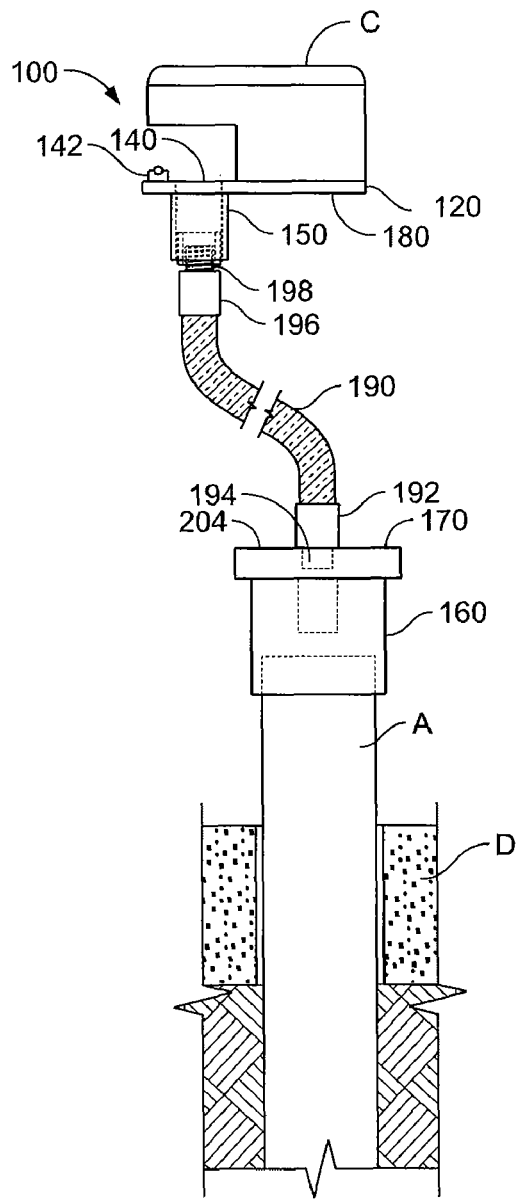
FIG. 4 shows a side view of a second embodiment.
Figure 5:
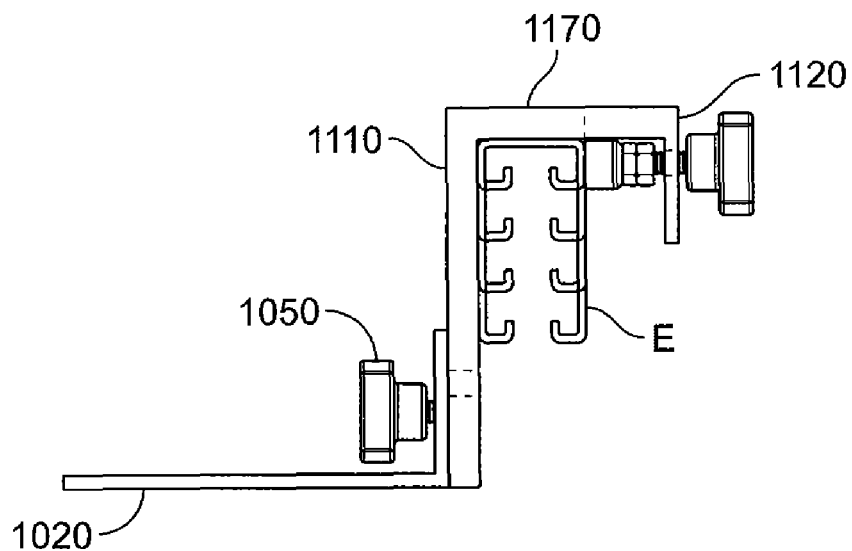
FIG. 5 shows a side view of a third embodiment mounted to a beam.
Figure 6:
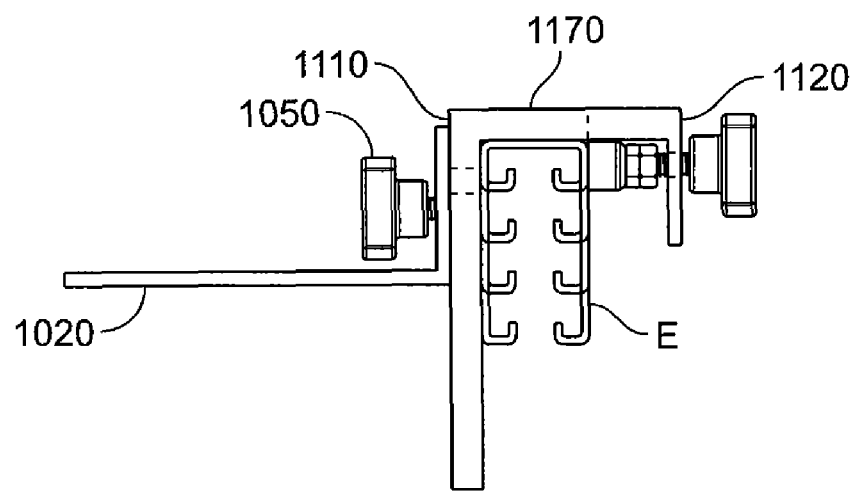
FIG. 6 shows a side view of a third embodiment mounted to a beam.
Figure 7:
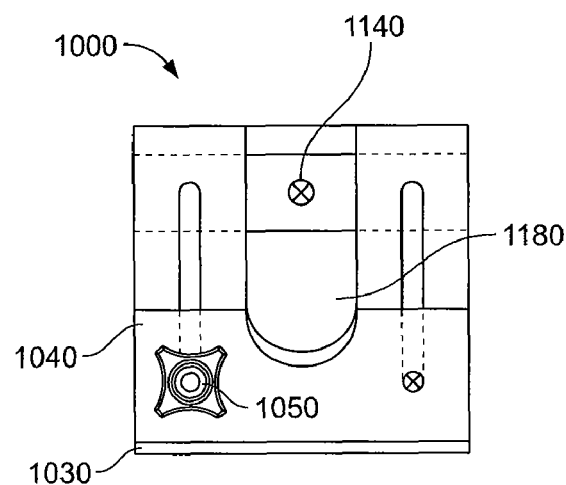
FIG. 7 shows an end view of a third embodiment.
Figure 8:
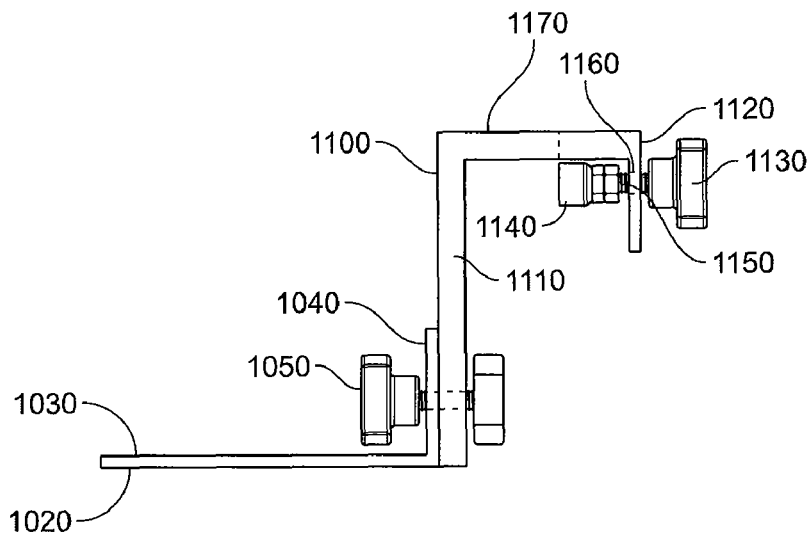
FIG. 8 shows a side view of a third embodiment.
Figure 9:
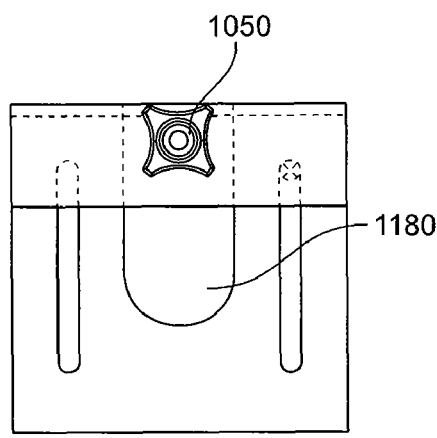
FIG. 9 shows an end view of a third embodiment.
Figure 10:
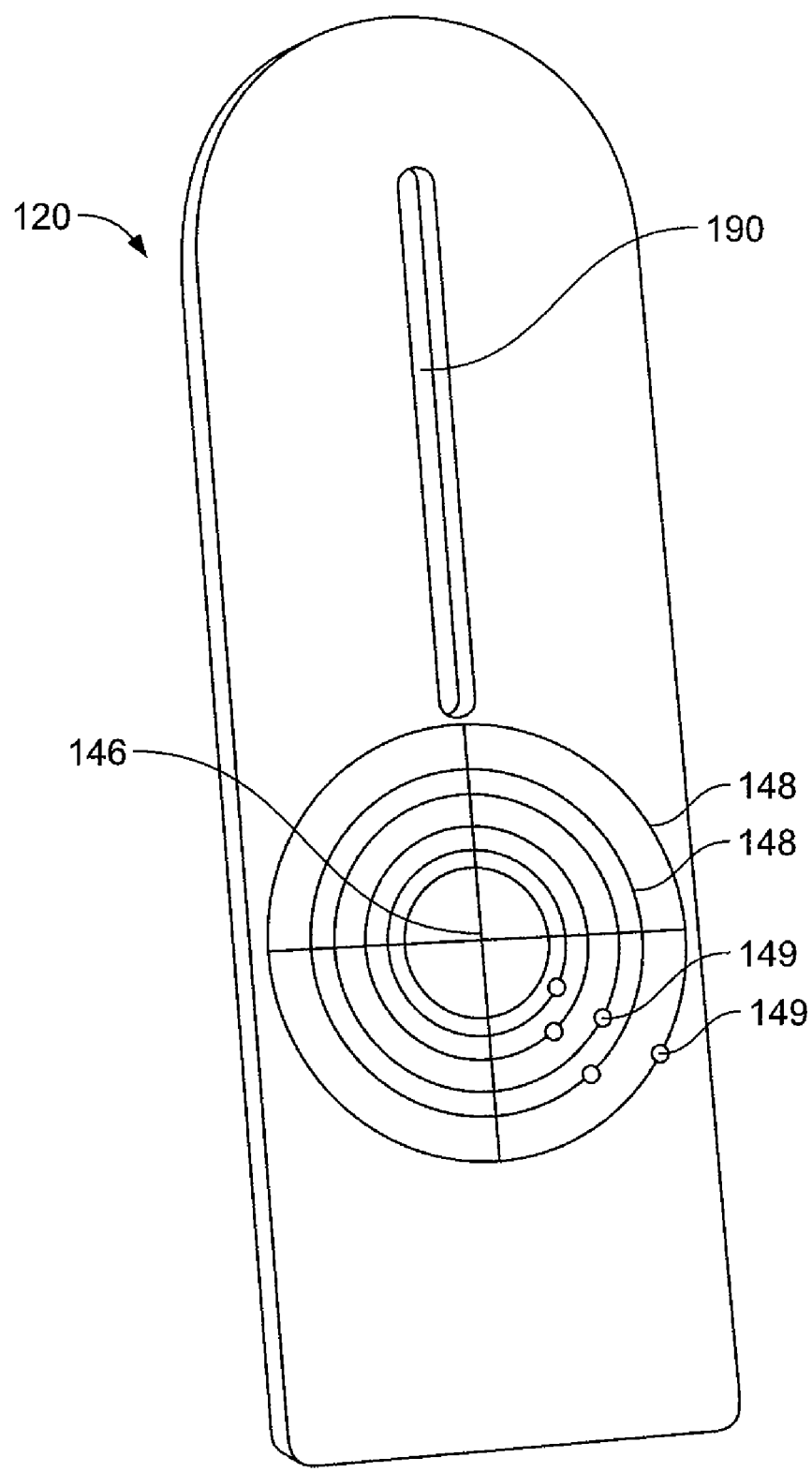
FIG. 10 shows a plan view of a second embodiment.
Figure 11:
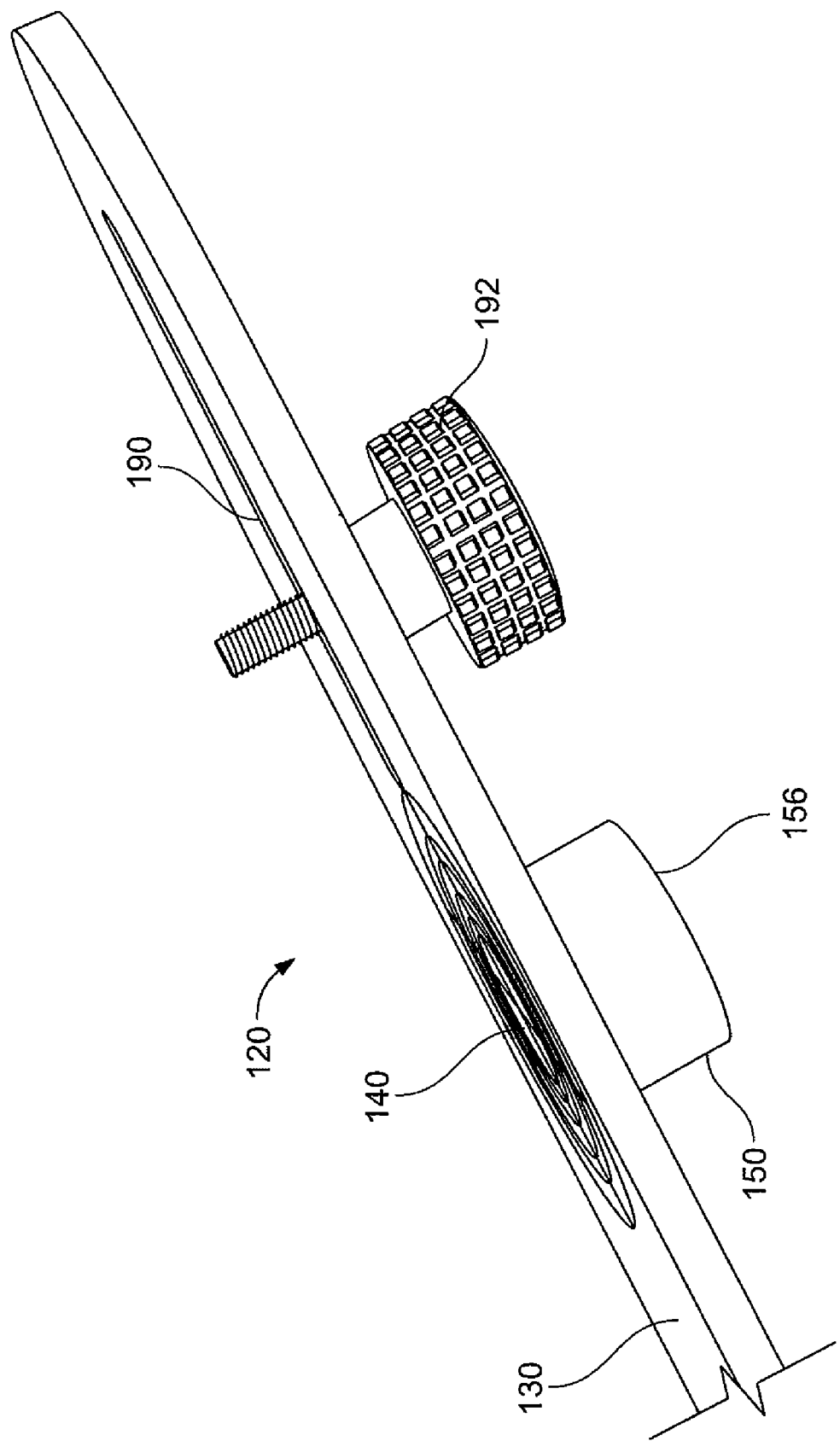
FIG. 11 shows a side view of a second embodiment.
Figure 12:
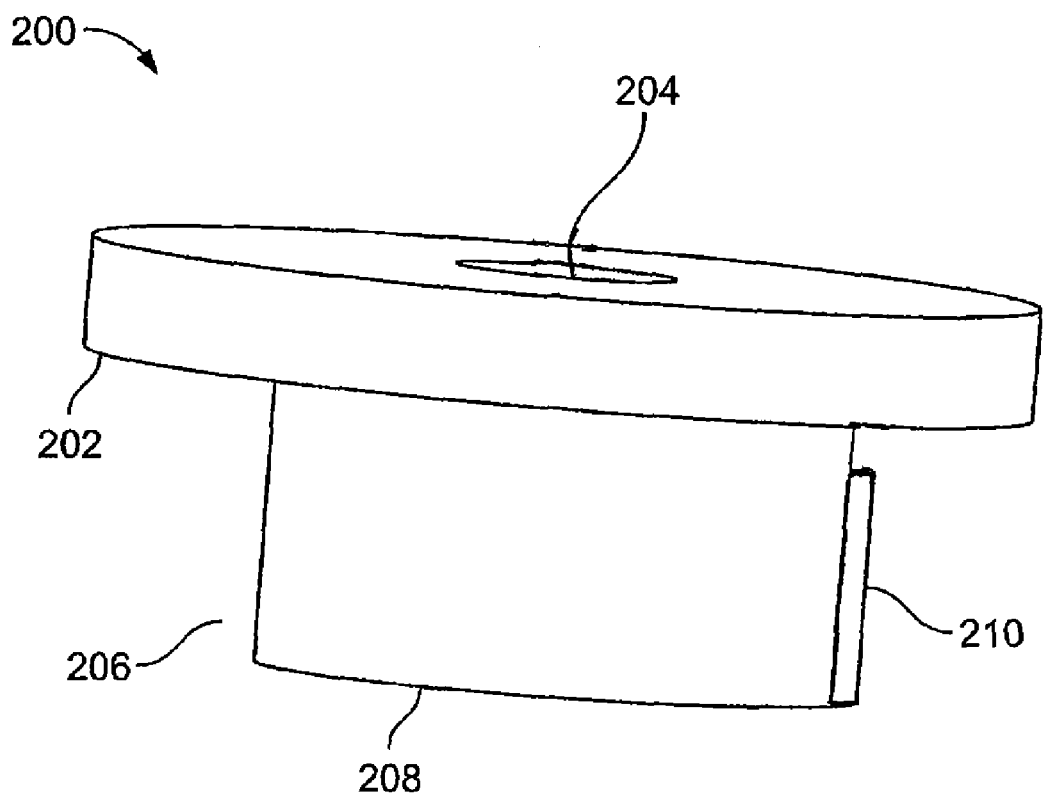
FIG. 12 shows a side view of a semi-rigid offset portion adaptor of a second embodiment.
Figure 13:
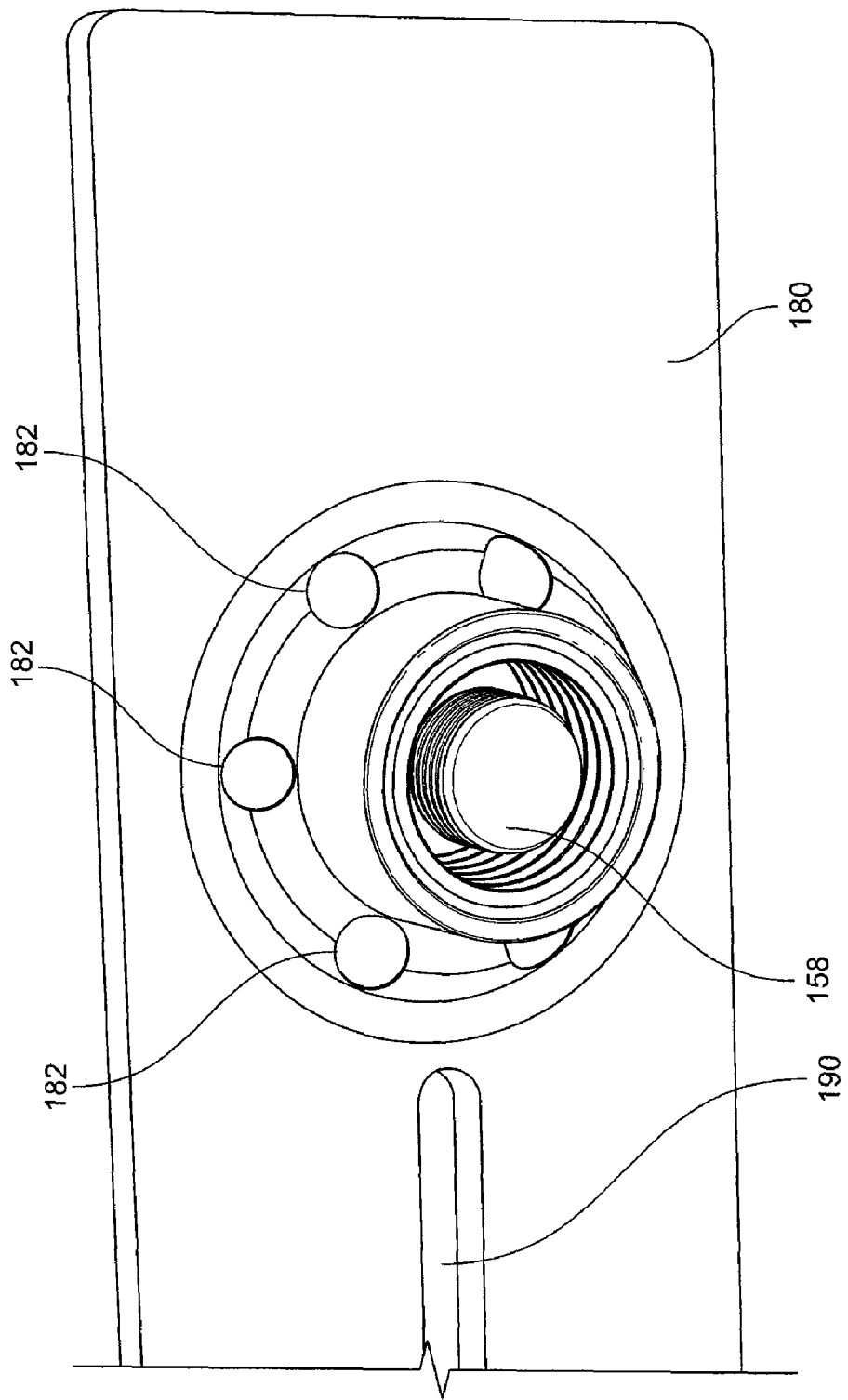
FIG. 13 shows a perspective view of a second embodiment.

Referring to FIGS. 3-4, and FIGS. 10-13, a second embodiment of a positioning system 100 for a laser alignment tool C is shown. In the second embodiment, positioning system 100 includes a laser platform 120 with a first laser mounting surface 130 and an opposing second surface 180. Mounting post 150 extends from a base 152, attached to second surface 180, to distal end 154. The central axis of mounting post 150 is perpendicular to the plane of laser platform 120. As shown in FIGS. 3-4, in a second embodiment mounting post 150 includes hollow interior portion 156 which includes threads 158 for coupling to a threaded coupling 194 or 198 of semi-rigid offset portion 190.

Target 140 is marked onto mounting surface 130 such that the center point 146 of target 140 aligns with the central axis of mounting post 150, and therefore with the center point of conduit stub A. Target 140 is preferably permanently marked with concentric circular indicia 148 corresponding to selected pipe sizes. A portion 149 of each circle 148 is color coded to correspond to a selected pipe size. Color coded portion 149 may include the entire circle indicia.

Laser platform 120 is preferably fabricated from a sheet of magnetic steel, of 1/16 inch (1.5 mm) thickness or greater, in order to provide adequate strength and magnetic coupling with the magnetic mount of laser C. Laser platform 120 may also be made from a combination of non-magnetic materials and magnetically susceptible materials to reduce weight or cost. Level indicator 142 is provided on laser platform 120 for easy visualization of true level, or to provide an angular measurement of the out-of-vertical displacement of conduit stub A, which may be askew as well as offset.

Semi-rigid offset portion 190 provides a flexible connection between mounting post 150 and conduit stub A. In the second embodiment, semi-rigid offset portion 190 consists of a length of flexible conduit, but other materials may be used. Semi-rigid offset portion 190 includes a first end 192 having threaded coupling 194 and an opposing second end 196 having threaded coupling 198. Preferably threaded couplings 194 and 198 are the same thread size for adaptability and simplicity of manufacture.

Semi-rigid offset portion 190 allows the installer to align laser device C with an offset connection point, through a ceiling for example, so that the horizontal and vertical displacement can be measured. Alternatively, semi-rigid offset portion 190, which retains its bend contours after positioning, could be used as a template for measuring the angle and bending a conduit or pipe using a radiused pipe bender. Preferably semi-rigid offset portion is a length of flexible metal conduit with a length of at least six inches, in order to provide adequate bend radius.

Mounting post adaptor 160 is similar to mounting post adaptors 60 and 60a shown in FIGS. 1 and 2, and includes a first portion 162 having threads 164 for coupling to a selected pipe thread and an opposing second portion 170 having a slip fitting adapted for receiving mounting post 150 within interior walls 172. Laser platform 120 preferably includes one or more magnets 182 mounted to laser platform second surface 180 to provide assist in seating laser platform 120 against a mounting post adaptor 160, similar to magnets 82 in the first described embodiment. Magnets 182 are attracted to a mounting post adaptor 160 to assist in securely fitting and holding mounting post 150 into an adaptor 160.

In this second embodiment, an offset portion adaptor 200 is provided to couple to mounting post adaptor 160. Offset portion adaptor 200 includes a first portion 202 having threads 204 which couple to at least one of threaded couplings 194 and 198, and an opposing second portion 206 having a slip fitting 208 which mates to slip fitting portion 170 of mounting post adaptor 160. As one can see, the cross section of slip fitting 208 is essentially identical to the cross section of mounting post 150 in order to be compatible. In this way, a plurality of mounting post adaptors may be used with a single laser platform and offset portion, and the laser platform 120 may be used either with or without offset portion 190.

In this second embodiment, slip fitting portion 170 includes a key portion 174 along interior walls 172, and offset portion adaptor 160 is provided with a complimentary key portion 210 in order to prevent rotation of offset portion 190 when it is bent. In the second embodiment key portion 210 is a ridge and key portion 174 is a receiving slot, in order to prevent interference between mounting post 150 and slip fitting 170, but other key systems may be used. For example, key portion 210 may comprise a post and key portion 174 an L-shaped slot to provide a "twist-lock" with positive capture.

Referring to FIGS. 3-4, in operation of the second embodiment, the connection methods are similar, but semi-rigid offset portion 190 is used in order to determine the required offset to reach a selected overhead point. Threaded coupling 198 couples to threads 158 in hollow portion 156 of mounting post 150. Offset portion adaptor 200 is coupled to offset portion end 192 using threads 194 and 204. A mounting post adaptor 160 is selected from a plurality of mounting post adaptors to match the thread of projecting conduit stub A and coupled to stub A. Offset portion adaptor slip fitting 208 is inserted into mounting post adaptor slip fitting portion 170 by aligning key portion 210 to key portion 174. Laser alignment tool C can now be mounted onto laser platform 120, preferably using magnetic coupling and by inserting clamping bolt 192 through slot 190 into a receiving bolt hole in laser alignment tool C. Laser alignment tool C is adjusted so that the downward pointed sighting laser is aligned on target center point 146.

Semi-rigid offset portion 190 may now be adjusted to align the laser aligning tool with a selected point above. The resulting offset from conduit stub A can be measured by the installer without the need to use a man lift or scaffolding and plum line. Level indicator 142 may provide a direct angular offset measurement to bend a transition pipe, or allow the operator to adjust offset portion 190 until it platform 120 is level. The installer can either use the measured offset to route the conduit to the selected point, or the installer can remove semi-rigid offset portion 190 and use it as a template to produce a section of conduit matching the radius of curvature or angular offset of semi-rigid offset portion 190. Alternatively, an operator may simply insert mounting post 150 directly into mounting post adaptor 160 if the offset portion 190 is not needed.

Referring to FIGS. 5-9, a third embodiment of a positioning system 1000 for magnetically attached laser alignment tools C is shown. Positioning system 1000 consists of beam clamp 1100 for fixing positioning system 1000 to a piping support beam E. Beam clamp 1100 includes vertical portion 1110 and a clamping portion for clamping to strut support beam E. In the disclosed embodiment, clamping portion consists of clamp hook 1120, threaded bolt 1150 extending through clamp hook 1120, with a handle 1130 at a first end and a clamp head 1140 at a second end, passing through threaded hole 1160. Threaded bolt 1150 has sufficient travel length such that any support beam E of standard dimensions can be clamped. Clamp hook top portion 1170 is provided to rest over top of a support beam E. Preferably clamping portion 1120 can accommodate standard strut beams of 5/8 inch through 3¼ inch width. Vertical portion 1110 includes a target slot 1180 extending along part of vertical portion 1110, which provides the ability to spot the laser device against the midpoint of support beam E, or another selected point on support beam E. Vertical portion 1110 includes a first and second guide slots 1060 and 1070, respectively, for receiving laser platform locking portion.

Laser platform 1020 is slidingly connected to beam clamp vertical portion 1110. Laser platform 1020 consists of a horizontal mounting surface 1030 for magnetically mounting a laser device C, vertical flange 1040 for mating to vertical portion 1110, and a locking portion 1050 and 1080 for selectively locking laser platform 1020 in a desired position relative to beam clamp 1100. Locking portion preferably consists of a threaded compression bolt 1050. In the disclosed embodiment locking the locking portion consists of a threaded bolt 1050 engaging a nut 1080 within first guide slot 1060. Preferably nut 1080 is recessed within first guide slot 1060 to avoid interference from strut beam E, and first guide slot 1060 includes a lip 1065 for engaging recessed nut 1080. Alternatively, first guide slot 1060 and recessed nut 1080 may be tapered, similar to a counter-sunk screw hole. A non-recessed nut 1080 may also be used if interference is not problematic. Aligning post 1090 extends rearward from vertical flange 1040 to engage second alignment slot 1070, in order to maintain laser platform 1020 fairly level. Horizontal mounting surface 1030 may include a scribed target such as calibrated circles and cross-hairs for vertical alignment as well. Laser platform 1020 may include a slotted hole for mechanically anchoring a laser alignment tool as well.

Referring to FIGS. 7a-8c, in operation of the third embodiment, the installer mounts beam clamp 1100 to support beam E by inserting top portion 1170 over beam E and tightening clamping portion 1120 against beam E. Laser device C is magnetically mounted to the mounting surface 1030 of laser platform 1020. Laser platform 1020 is then adjusted vertically along vertical member 1110 until the target laser aligns with the midpoint (or other selected point) of support beam E. The target laser can indicate on support beam E through target slot 1180, which extends along a portion of vertical member 1110, at least including the upper portion of vertical member 1110. Locking portion 1050 is tightened against vertical member 1110 to lock laser platform 1020 in the selected position.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A laser alignment tool positioning system, comprising:
   a laser platform, said laser platform including:
      a first mounting surface and an opposing second surface, wherein said laser platform includes materials which are magnetically susceptible;
      a mounting post having a base connected to said laser platform second surface and a distal end extending perpendicularly from said laser platform second surface; and,
      a target marked permanently onto said first mounting surface, said target including indicia marking the center point of said mounting post; and,
   a plurality of mounting post adaptors, each of said mounting post adaptors having a first threaded portion adapted for connecting to a selected threaded pipe end, and an opposing second slip portion adapted for receiving said mounting post distal end therein.

2. A positioning system as in claim 1, wherein said laser platform further includes a slotted mounting hole penetrating there through.

3. A positioning system as in claim 1, wherein each of said plurality of mounting post pipe adaptors is made from magnetically susceptible materials, and wherein said laser platform further includes one or more magnets mounted to said second surface proximal to said mounting post base.

4. A positioning system as in claim 1, further comprising:
   a semi-rigid offset portion including first and second opposing threaded ends;
   an offset portion adaptor comprising: a first threaded portion adapted to couple to at least one of said offset portion threaded ends, and an opposing second slip fitting portion adapted to couple with said mounting post adaptor slip portion; and,
   wherein said mounting post further includes a hollow interior portion having a threaded portion adapted to couple to at least one of said offset portion threaded ends, and further wherein said mounting post distal end is open to said hollow interior.

5. A positioning system as in claim 1, wherein said target further comprises a plurality of concentric circles centered on said center point, each of said plurality of circles indicating a circumference of a selected pipe size.

6. A positioning system as in claim 4, further comprising at least one magnet mounted to said laser platform second surface proximal to said mounting post, such that said at least one magnet magnetically couples with a mounting post adaptor when said laser platform mounting post is received in said mounting post adaptor slip portion.

7. A positioning system as in claim 5, wherein each of said concentric circles includes a color coded portion corresponding to said selected pipe size.

8. A positioning system as in claim 1, wherein said target further comprises a plurality of concentric circles centered on said center point, each of said plurality of circles indicating a circumference of a selected pipe size, and wherein each of said concentric circles includes a color coded portion corresponding to said selected pipe sizes, and wherein each of said plurality of mounting post adaptors includes a color coded portion corresponding to one of said color coded target circles matching the corresponding pipe size of said mounting post adaptor's first threaded portion.

9. A positioning system as in claim 1, further comprising a level indicator mounted to said laser platform.

10. A positioning system as in claim 1, further comprising at least one magnet mounted to said laser platform second surface proximal to said mounting post, such that said at least one magnet magnetically couples with a mounting post adaptor when said laser platform mounting post is received in said mounting post adaptor slip portion.

* * * * *